United States Patent [19]

Andersen et al.

[11] Patent Number: 4,577,663

[45] Date of Patent: Mar. 25, 1986

[54] FLUID ACCUMULATOR

[75] Inventors: Per B. Andersen, Åneby, Norway; Ole J. Richter, Karlstad, Sweden

[73] Assignee: Myrens Verksted A/S, Oslo, Norway

[21] Appl. No.: 615,794

[22] Filed: May 31, 1984

[30] Foreign Application Priority Data

Jun. 6, 1983 [NO] Norway ................................ 832042

[51] Int. Cl.[4] ............................................. F16L 55/04

[52] U.S. Cl. ......................................... 138/31; 138/26

[58] Field of Search .............................. 138/26, 31, 30

[56] References Cited

U.S. PATENT DOCUMENTS

| | | | |
|---|---|---|---|
| Re. 24,223 | 9/1956 | Ford et al. | 138/31 |
| 1,959,640 | 5/1934 | Peters | 138/31 |
| 2,703,108 | 3/1955 | McCuistion | 138/31 |
| 2,790,462 | 4/1957 | Ashton | 138/31 |
| 3,047,023 | 7/1962 | Dick | 138/31 |
| 3,138,303 | 6/1964 | Hoveland | 138/31 |

FOREIGN PATENT DOCUMENTS

| | | | |
|---|---|---|---|
| 166576 | 2/1954 | Australia | 138/31 |
| 293421 | 7/1965 | Netherlands | 138/31 |

*Primary Examiner*—James E. Bryant, III
*Attorney, Agent, or Firm*—Holman & Stern

[57] ABSTRACT

A fluid accumulator (1), preferably for use in connection with a hydraulic system which is to receive relatively large quantities of working fluid in a short period of time comprises a housing (2) and a piston (3) arranged therein, which separates the working fluid, especially an oil, from an expanding fluid, especially a gas, and which easily can be displaced in the housing (2) in dependence of the pressure conditions arising from the hydraulic system by being adapted to float freely between the two fluid phases by providing between the outer surface of the piston (3) and the inner wall of the housing (2) a space (7*c*) in which the two fluid phases can communicate freely and which at the same time provides a fluid sliding layer so that the piston (3) can quickly and effectively move between its various positions. The piston (3) has the shape of a cylindrical cup having a relatively large extension in the axial direction and having its opening facing upwardly. The unique structure of the piston (3) makes it possible to work under pressure conditions in the range of 200–350 bars.

8 Claims, 1 Drawing Figure

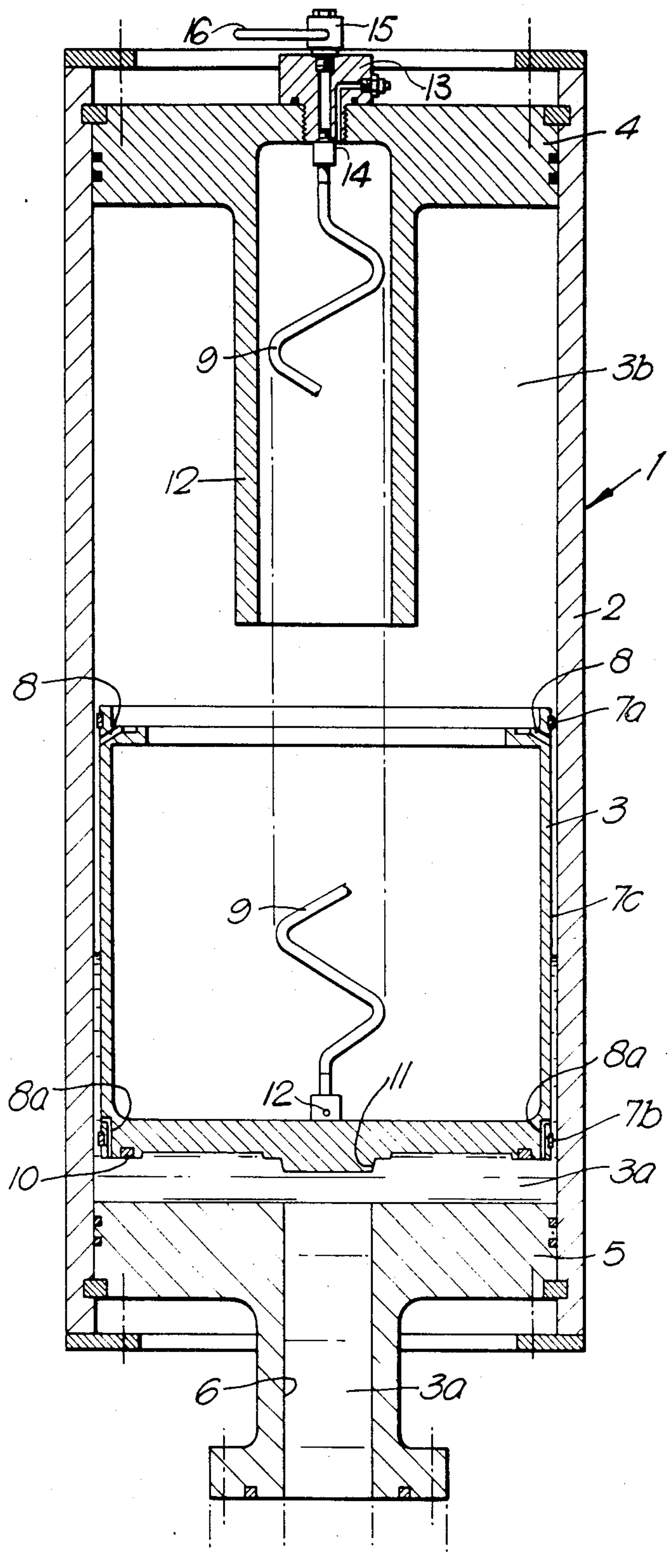
16
15
13
4
14
9
3b
12
1
2
8
8
7a
3
9
7c
8a
8a
12
11
7b
10
3a
5
6
3a

FLUID ACCUMULATOR

BACKGROUND OF THE INVENTION

1. Field of the Invention

The present invention relates to a fluid accumulator, preferably for use in connection with a hydraulic system which is to receive and deliver, respectively, large quantities of working fluid during a short period of time, comprising a housing and a piston arranged therein, which separate the working fluid, especially a liquid, from an expanding fluid, especially a gas, and which is adapted to float freely between the two phases of fluid.

2. Description of the Prior Art

The present fluid accumulator refers to the category of piston accumulators having a movable piston arranged in a housing, the one fluid normally being a liquid, for example an hydraulic oil, and the second fluid being a gas which will be compressed when liquid is pumped into the housing on the one side of the piston. When the pressure on the liquid side is reduced, the gas will expand and press the liquid or hydraulic oil out of the housing.

There are previously known fluid accumulators of this type, but such piston accumulators have been hampered with the disadvantage that the piston sealing rings which pass along the inner wall of the housing when the piston moves in pace with the pressure variations, will be apt to entrain the oil film which is deposited on the wall of the housing. This oil will mix with the gas phase of the other side of the piston, and this mixture is very unfavourable for the normal operation of the accumulator. Further, the oil will collect on the upper side of the piston and bring about, as time passes by, a sinking of the piston towards the bottom of the accumulator, resulting in a termination of the function thereof. The same effect will occur if damage on the sealing or seizing of the cylinder walls leads to leakage between the gas and the oil side of the piston.

The present fluid accumulator shall be able to store large quantities of energy, a fact which includes that it must have a large volume and be able to work under high pressure. Such a fluid accumulator is foreseen to be produced in sizes of 100 liters to 800 liters in volume. The gas filling pressure can be up to 200 bars, whereas the system pressure can be up to 350 bars, although these figures are not an upper limitation for volume and pressure.

Within this working range there are today used conventional piston accumulators, for example of the type which is disclosed in U.S. Pat. No. 2,715,419, or a battery of bladder accumulators connected in parallel.

The principle difference between a conventional piston accumulator and the present fluid accumulator is the inclusion in the conventional accumulator of a compact piston having a sealing against the cylinder wall, whereas the present accumulator comprises a free, floating piston.

It is true that other equipment working with a free, floating piston exists, inter alia some implementations of pressure surge dampers, but although these devices operate more or less according to the same principle as regards the separation of the working fluid, especially a liquid from an expanding fluid, especially a gas, these devices are not able to undertake the same working operations as the present accumulator, which comprises a piston which is designed with a view to accomplish the heavy working operations under the pressure conditions which here are relevant, i.e. in the range of 200–350 bars.

German Offenlegungsschrift No. 3.143.890, and U.S. Pat. Nos. 2,317,796, 1,959,640 and 2,725,897 all relate to a float which is formed as a sealed container. Prepared from known metallic materials these known float structures would not be able to withstand the pressure in question, and possibly would be too heavy for floating in oil.

From U.S. Pat. No. 1,116,614 there is known a flat and low floating body which presumably can be prepared from a material which can float at the pressure in question (not wood or cork). Compared with a piston such a disc-shaped flat floating body will render a poor separation of oil and gas, and it can further easily stick due to insufficient guiding. Besides, the known floating body which is arranged in a bumper, will not be able to prevent gas from seeping into the system.

From U.S. Pat. No. 1,779,448 there is known a piston which is comprised of two cylindrical parts having different diameters, the piston having an opening which is facing down towards the liquid (oil). Such a piston would be able to withstand the pressure in question, but if for example the system pressure is twice as great as the gas filling pressure, oil will be pressed up into that part of the piston which has a large diameter, and the ability of the piston or the float to separate oil and gas will then vanish.

Additionally, the apparatus according to U.S. Pat. No. 1,779,448 is arranged for absorbing surge waves in for example oil pipes and is constructed for quick inflow of oil, but without a view of enabling the oil to leave the apparatus just as quickly, as is the case in fluid accumulators. Accordingly, no preference has been included in the apparatus regarding the requirement of separating gas and liquid, as is the case in fluid accumulators.

SUMMARY OF THE INVENTION

An object of the present invention is to provide a fluid accumulator which complies with the above-mentioned requirements, and which is not hampered by the above-mentioned disadvantages included in known accumulators.

This object is achieved in a fluid accumulator of the type mentioned in the preamble, which according to the invention is characterized in that the piston takes the form of a cylindrical cup having a relatively long dimension in the axial direction and the opening thereof facing upwards.

The piston according to the present accumulator has two primary objects, that is (a) to reduce the possibility of the gas being absorbed by the oil, the contact surface between the oil and the gas is reduced as much as possible, and (b) to block the outlet in the bottom of the accumulator when the system pressure is less than the gas filling pressure.

A condition for the piston to fulfil these requirements is that it can withstand the pressure of its surroundings and that it floats in the working fluid, i.e. oil.

By means of a free floating piston of this special type, i.e. a piston having a circumferential play to the inner wall of the house and being able to move freely both axially and about its center axis, there is achieved an accumulator which operates satisfactorily even under extreme loading conditions.

The layer of oil and gas which surrounds the piston, provides not only a good and stable separation between the oil on the one side of the piston and the gas on the other side of the piston, but also provides a sliding layer which involves that the piston quickly and effectively can move between the various positions independent of the pressure conditions required by the hydraulic system to which the fluid accumulator is connected.

Compared with known fluid accumulators having pistons and sealing rings the present fluid accumulator avoids the disadvantages having an outspring in the sealing rings, the fluid accumulator according to the present invention also allowing the construction of just as large accumulators of the "piston type" as before, for example in the size range of 400 liters or more.

Also compared with known accumulators of the bladder or bellows type the present accumulator achieves a series of advantages. In connection with bellows-type accumulators one is limited to accumulator sizes of approximately 50 liters, the size of the bellows setting the limit for larger containers. Further, such bellows accumulators comprise movable valve means at the outlet on the oil side, which valve means at extreme pressure variations often are so heavily loaded that parts of the valve can be knocked off and passed out in the connected oil system. Further, there often occur punctures of the bladder due to wrong gas pressure or foreign objects in the oil.

In the present fluid accumulator no bottom-valve system is required, the piston on the underside being equipped with a sealing ring which comes in contact around the oil outlet opening of the housing when the piston is in its lowermost position.

As a further measure the piston is on the liquid side equipped with a bumper.

BRIEF DESCRIPTION OF THE DRAWING

The invention will now be further described in detail with reference to the accompanying drawing which is a longitudinal cross-sectional view through an appropriate embodiment of a fluid accumulator according to the invention.

DETAILED DESCRIPTION OF A PREFERRED EMBODIMENT

In the drawing there is illustrated a fluid accumulator which is generally designated by 1, and which is used in connection with a hydraulic system which requires relatively large quantities of fluid during a short period of time.

The accumulator 1 relates to the so-called piston category, the substantially cylindrical cover or housing 2 holding a movable piston 3 which separates a working fluid, especially a liquid or an oil 3*a*, which is found on the underside of the piston, from an expanding fluid, especially a gas 3*b*, which is found on the upper side of the piston 3.

The housing or the shell 2 is at the top closed by means of an end cover 4 which prevents demounting under pressure. At the lower end the accumulator 1 is terminated by a second end cover 5 which is also mounted such that demounting under pressure is prevented, the end cover 5 being provided with an axial bore 6 which communicates with a hydraulic system which requires a relatively large quantity of oil during a short period of time.

Thus, the accumulator 1 will on the upper side of the piston 3 have a body of gas 3*b* which has a pressure depending on the position of the piston in the accumulator 1. The gas which is on the upper side of the piston 3, will be compressed when oil is pumped through the bore 6 in the lower end cover 5, i.e. influences the lower part of the piston 3 so that this will move towards the body of gas to produce a larger gas pressure as well as a larger volume for the oil.

When, on the other hand, the hydraulic system which is connected to the accumulator through the end cover 5, requires a large quantity of oil, the oil pressure on the underside of the piston 3 will be reduced at the same time as the gas above the piston 3 will expand and press the oil out through the bore 6.

The piston 3 excels in being adapted to float freely between the two fluid phases, i.e. the gas phase on the upper side of the piston and the oil phase on the lower side of the piston. The piston 3 is made of a material having a low specific weight and is shaped as a cup having a relatively long axial elongation, and will due to the circumferential play to the inner wall of the housing be able to move both axially and also around its center axis depending on the pressure conditions prevailing on the upper side and on the lower side of the piston 3, respectively. At its upper end lower circumference the piston 3 is equipped with sliding rings or supporting rings, 7*a* and 7*b* respectively, these sliding rings being fashioned more or less continuously, so that fluid can communicate in the free play existing between the piston 3 and the inner wall of the housing 2. Thus, it is to be understood that the sliding rings 7*a* and 7*b* serve as guiding rings for avoiding contact between the metal in the piston 3 itself and the inner wall of the housing 2. Thus, the guiding rings must not be understood as sealing rings.

To further provide for the oil 3*a* to freely enter the space between the piston 3 and the inner wall of the housing 2 there is in the bottom portion of the piston provided a series of communication channels 8*a*.

Although between the outer wall of the piston 3 and the inner wall of the housing 2 there exists an open chamber 7*c*, there will not be any mixture of oil on the lower side of the piston and the gas on the upper side of the piston, since the outer walls of the cup-shaped piston 3, which are relatively long in the axial direction, produce a zone of separation between the two fluids, which is maintained for most of the positions of the piston during normal operation. The layer of oil and gas which surrounds the piston not only provides a stable separation between the oil on the one hand and the piston and the gas on the other hand, but also a fluid sliding layer which gives rise to the fact that the piston quickly and effectively can move between its various positions depending on the pressure conditions which are required by the connected hydraulic system.

Normally, the oil will thus stay in the area below the piston, the piston at the same time being surrounded by oil and floating therein. In case there should occur a too large rise of oil in the space between the piston 3 and the inner wall of the housing 2, excess oil will be passed into the piston 3 via upper communication openings 8 and be collected at the bottom of the cup shaped piston 3. If necessary the collected oil can be drawn out by means of an appropriate hose which in the illustrated embodiment is generally designated by 9, and which is adapted by being flexible to follow the upwards and downward movements of the piston. The lower end of hose 9 is provided with a suitable fitting having an inlet opening 12 and the upper end of the hose is connected by suitable fittings 13, 14, 15 through upper end cover 4 and further hose 16 to a suitable suction device (not shown).

A further purpose of the openings 8 at the top of the piston 3 is to improve the communication between the gas and oil side, especially because the piston 3, since it is to float as easily as possible, is manufactured from a material having a low specific weight and as small a material thickness as possible. The walls of the piston which during normal operation have the same pressure on both sides, are therefore thin. If the ratio between the gas filling pressure and the system pressure is such that the piston 3 moves to the top of the accumulator, the openings 8 prevent the occurrence of such a large pressure difference between the outside and the inside of the piston wall that it breaks.

On its lower side the piston 3 is provided with a sealing ring 10 which abuts the lower end cover 5 around the oil outlet opening of the housing, i.e. the upper mouth of the bore 6 when the piston 3 is in its lowermost position. Thus the sealing ring 10 is included in an end valve system which does not require movable parts. The sealing ring 10 prevents leakage of gas into the hydraulic system when the oil pressure is very low and the piston 3 is in its bottom position.

In addition to the sealing ring 10 the piston 3 can on its lower side be equipped with a bumper 11 which appropriately can be constructed conically for gradually throttling the oil outlet through the bore 6 if the ratio between the gas pressure and the system pressure should be such that the piston 3 moves towards the bottom of the accumulator. Thus the bumper 11 or the throttling means prevents a pressure surge which can arise when a liquid stream is suddenly cut off, as and the piston from being hardly struck against the end bottom.

The structural requirements which have been met in the present piston make it operational under all practical pressure conditions which might occur.

The accumulator can be filled with gas to a desired prefilling pressure, for example 200 bars. The system pressure is then 0, and the piston abuts against the lower end bottom and rests on a ring area at the sealing ring 10 and a divided ring area around the braking cone 11. The sealing ring 10 prevents gas from coming out of the system. To ensure that the system pressure should not later propagate to below the complete end bottom and lift the piston, the piston cannot rest on the complete end bottom but only on the said ring areas.

In this situation the complete piston bottom has a pressure of for example 200 bars on the upper side, 0 bars on the lower side and rests on two ring areas. Thus, the piston bottom must be manufactured sturdy from a light material having a large tensional strength. The piston walls have the same pressure on both sides and are made relatively thin and from a light material.

The system pressure is increased by means of a hydraulic pump, and when this pressure corresponds to the gas filling pressure, the piston will take off from the bottom at the same time as oil is pumped into the accumulator and the gas is compressed and obtains a larger pressure. The pump will continue to pump oil into the accumulator until the set maximum system pressure is reached, for example 350 bars.

Upon the occurrence of a large possibly momentarily oil consumption in an actuator the system pressure will be reduced, and the gas will then expand and press the necessary quantity of oil out into the system. Thereafter the pump will pump oil into the accumulator until the set maximum pressure once again is reached. By choosing the correct accumulator volume and correct ratio between the gas pre-loading pressure and the system pressure, the piston will during normal operation go up and down in the cylinder without touching the end bottoms. In this situation the pressure is approximately equal on all parts of the piston.

Aside from having the form of a cylindrical cup having the opening facing upwardly, the present piston has a relatively long extension for thereby ensuring buoyancy and a good guiding. The material and dimensions of the piston are so chosen that the oil level reaches approximately to the middle of the piston wall, which prevents oil during rapid accelerations and retardations from being pressed over the piston, or gas from being forced under the piston.

The possibility for the occurrence of this mixture of oil and gas is further reduced in that the play between the lower guiding segments and the cylinder wall is very small, whereas the remaining play between the piston and the cylinder wall is so large that some oil can pass the guiding segments without substantially altering the oil level. The small play between the guiding segments and the cylinder wall ensures also quiet conditions in that zone in which the oil and gas meet.

Upon the occurrence of gas leakage or wrong use it may be contemplated that the gas prefilling pressure is so low relative to the system pressure that the piston is pressed against the upper end cover. It will then develop a pressure difference between the lower side of the piston bottom and the other parts of the piston, which depends on the capacity of the pump and the play between the piston and the cylinder. To prevent the piston 3 from collapsing in such a situation, there is on the end cover 4 provided a downwardly extending pipe 12 which will abut against the piston bottom in the center thereof, at the same time as the upper edges of the piston walls will abut against the lower main surface of the end cover 4. Further, because there are, at the upper portions of the piston, provided relatively large communication channels by passing the upper guiding segments, it is possible to prevent the occurrence of a larger pressure difference between the outside and the inside of the relatively thin and slender piston wall.

The present pressure accumulator is very well suited for automatic installations which do not require any extensive supervision and maintenance. By suitably measuring the pressure difference in the accumulator, for example by means of a pressure differential measuring means or means for measuring the position of the piston in the housing 2, for example by means of ultrasonic or similar devices or in an other manner, it is possible to automatically supervise possible operational deviations which involve oil being collected in the cup-like piston 3. In case such deviations should be observed, surplus oil can easily be drawn out via for example the flexible hose 9 as previously described, the oil on the upper side of the piston changing the natural or normal oil pressure characteristics.

We claim:

1. In a fluid accumulator, for use in a hydraulic system which receives and delivers large quantities of working fluid during a short period of time, including a cylinder having end walls, a piston slidably operable in the cylinder between the end walls, a compressible fluid acting on one side of the piston in the cylinder, and a liquid port in the cylinder through which liquid flows into and out of the cylinder to act on the opposite side of the piston so that when the liquid pressure is higher than the pressure of the compressible fluid it moves the piston to compress the compressible fluid so that more liquid can be stored in the cylinder and when the pressure of the liquid is lower than the pressure of the compressible fluid, the compressible fluid moves the piston to force the liquid out of the cylinder, the improvement comprising:

a cup-shaped piston having a base portion and a relatively long axial extending cylindrical wall portion with the opening thereof facing towards the end of the cylinder containing the compressible fluid;

said wall portion being relatively thin compared to the base portion and having an outer dimension less than the dimension of the inner surface of the cylinder to provide a space therebetween the full length of said wall portion;

sliding support rings mounted in axially spaced relationship on the outer surface of said wall portion having an outer dimension less than the inner dimension of the surface of the cylinder so that said piston floats freely between said liquid and compressible fluid ends in the cylinder;

a stroke limiting extension projecting from the end wall at the compressible fluid end of the cylinder toward said piston having a length so that the end remote from the cylinder end engages said base portion of the piston when said piston is in its limit of travel toward the compressible fluid end with the end of said wall portion of the piston abutting said compressible fluid end of the cylinder; and a sealing ring on the liquid side of the piston around said liquid port which abuts against the liquid end of the cylinder when the piston is in its limit of travel toward the liquid end of the cylinder.

2. Accumulator as claimed in claim 1 wherein said cylinder is vertically orientated with the compressible fluid end at the upper end and further comprising:

a flexible suction hose connected at one end to the compressible fluid end of the cylinder and at the other end to the compressible fluid side of said base portion of the piston;

an opening in said other end of said hose communicating with the opening of said cup-shaped piston adjacent the surface of said base portion;

channel means through the compressible fluid end of the cylinder communicating with said one end of said flexible hose; and means to connect said channel means to a suction means so that liquid overflowing said wall portion and collected inside said cup-shaped piston can be drawn out of said piston.

3. Accumulator as claimed in claim 2, wherein said sliding support rings comprise upper and lower rings positioned adjacent the ends of the piston, and further comprising:

at least one opening through said wall portion of the piston extending from a position adjacent to and below said upper ring to conduct liquid therethrough.

4. Accumulator as claimed in claim 3 and further comprising:

at least one opening extending through said base portion of the piston from the bottom surface adjacent the outer edge thereof to the radially outermost surface thereof adjacent to and above said lower ring.

5. Accumulator as claimed in claim 2 wherein said liquid port extends through the liquid end of the cylinder and further comprising:

a conically-shaped element projecting from the lower side of the piston and aligned with the liquid port to engage therein to produce a throttling of the liquid passing through said port when the piston is in its lower positions.

6. Accumulator as claimed in claim 4 wherein said liquid port extends through the liquid end of the cylinder and further comprising:

a conically-shaped element projecting from the lower side of the piston and aligned with the liquid port to engage therein to produce a throttling of the liquid passing through said port when the piston is in its lower positions.

7. Accumulator as claimed in claim 1, wherein the material and the dimensions of the piston are chosen so that the piston during normal operating conditions is submersed in the liquid from approximately $\frac{1}{4}$ to $\frac{3}{4}$ of its height.

8. Accumulator as claimed in claim 7, wherein the piston during normal operating conditions is halfway submersed in the liquid.

* * * * *